United States Patent
Nagasaka (10) Patent No.: US 7,537,396 B2
(45) Date of Patent: May 26, 2009

(54) OPTICAL MODULE AND HOLDER FOR OPTICAL MODULE

(75) Inventor: Kimio Nagasaka, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/756,236

(22) Filed: May 31, 2007

(65) Prior Publication Data

US 2007/0292094 A1    Dec. 20, 2007

(30) Foreign Application Priority Data

Jun. 14, 2006   (JP)   ............... 2006-164402

(51) Int. Cl.
*G02B 6/00*   (2006.01)
*G02B 6/36*   (2006.01)

(52) U.S. Cl. .............. 385/92; 385/88; 385/89; 385/136; 385/137

(58) Field of Classification Search .......... 385/88–89, 385/92, 134–137
See application file for complete search history.

(56) References Cited

U.S. PATENT DOCUMENTS

| 6,074,104 | A | 6/2000 | Higashikawa |
| 6,318,910 | B1 | 11/2001 | Higashikawa |
| 6,697,399 | B2 * | 2/2004 | Kimura et al. ............. 372/36 |
| 2003/0123820 | A1 * | 7/2003 | Takagi ..................... 385/92 |
| 2004/0141699 | A1 | 7/2004 | Sato |
| 2006/0039657 | A1 * | 2/2006 | Okada et al. ............. 385/89 |

FOREIGN PATENT DOCUMENTS

| JP | A 10-293230 | 11/1998 |
| JP | A 2002-50824 | 2/2002 |
| JP | A 2003-207694 | 7/2003 |
| JP | A 2004-152991 | 5/2004 |

* cited by examiner

*Primary Examiner*—Frank G Font
*Assistant Examiner*—Michael P Mooney
(74) *Attorney, Agent, or Firm*—Oliff & Berridge, PLC (57) ABSTRACT

An optical module includes: an optical plug that supports one end of an optical fiber; a receptacle unit that has an optical element and optically couples the optical fiber and the optical element; a holder having a through hole for passing the optical fiber and a housing section that contains the optical plug and at least a portion of the receptacle unit; and a tube that is coupled to the through hole and extends outside of the holder.

11 Claims, 9 Drawing Sheets

FIG. 6C $$RB2^2 = \left(\frac{1}{2}DB2\right)^2 + \left(RB2 - \frac{1}{2}HB\right)^2 \quad \text{---- (1)}$$

$$DB2 = \sqrt{4RB2 \cdot HB - HB^2} \quad \text{---- (2)}$$

OPTICAL MODULE AND HOLDER FOR OPTICAL MODULE

BACKGROUND

1. Technical Field

Several aspects of the present invention relate to optical modules that are used for optical communications.

2. Related Art

As a typical example of an optical module that is used for optical communications, an optical module described in Japanese laid-open patent application JP-A-2003-207694 is known. The optical module described in the above document uses a structure in which an optical fiber connector having an array of optical fibers regularly arranged and bonded together is pushed toward a package and affixed by a clamp.

However, in the exemplary optical module described above, the optical fiber connector, the clamp and the package are formed independently from one another as separate members, and the work to assembly these members is complex. Also, when an external force (for example, a pulling force or the like) is applied to the optical fiber, relative positions among the optical fiber connector, the clamp and the package would likely be changed, such that the optical coupling efficiency may be deteriorated.

SUMMARY

In accordance with an advantage of some aspects of the present invention, there is provided an optical module that can be readily assembled, and can prevent deterioration of the optical coupling efficiency which may be caused by a shift in relative positions among the component parts. In accordance with another advantage of some aspects of the present invention, it is possible to alleviate concentration of stress and strain in an optical fiber.

(1) An optical module in accordance with an embodiment of the invention includes: an optical plug that supports one end of an optical fiber; a receptacle unit that has an optical element and optically couples the optical fiber and the optical element; a holder having a through hole for passing the optical fiber and a housing section that contains the optical plug and at least a portion of the receptacle unit; and a tube that is coupled to the through hole and extends outside of the holder.

According to the structure described above, even when the optical plug and the holder are contained at positions mutually shifted from each other, the resultant deformation (bent) becomes gentler, such that concentration of stress and strain can be alleviated. In particular, the permissible range of positional deviations between the optical plug and the holder is improved, compared to a case where the optical fiber is affixed at a position near the through hole. Also, because optical fibers are somewhat bundled together by the tube, their handling becomes relatively easy. Further, the assembly work becomes easier. Also, the tube or the through-hole can serve as a guide for positioning the optical fiber, such that the optical plug can be more readily housed.

Preferably, the through hole may be formed in a side surface of the holder, and the tube may be bonded to an eaves section that is formed above the through hole and protrudes outside of the holder. By this structure, the tube can be affixed to the eaves section.

Preferably, the through hole may be formed in a side surface of the holder, and the tube may be disposed in a manner to cover an eaves section that protrudes outside of the holder from an outer circumference of the through hole and is connected to the eaves section. By this structure, the tube can be affixed to the eaves section.

Preferably, the tube may be bonded to the eaves section by thermocompression bonding. By this structure, the eaves section and the tube can be readily connected to each other.

Preferably, the eaves section may have irregular sections formed on both sides thereof. According to this structure, the tube can be more strongly affixed to the eaves section by the irregular sections.

Preferably, each of the irregular sections has a saw-tooth shaped cross section. According to this structure, the tube can be more strongly affixed to the eaves section by the saw-tooth shaped irregular sections.

Preferably, the tube may be adhered to an outer circumferential section of the through hole inside the holder. According to this structure, the tube can be affixed to the holder by using the inside surface of the holder.

Preferably, the tube may be split in a longitudinal direction thereof. According to this structure, the optical fiber can be stored inside the tube through the split of the tube, such that its assembly work becomes easier.

Preferably, the optical fiber may be bonded to the tube at an end section of the tube on the opposite side of the through hole. According to this structure, the tube and the optical fiber are affixed to each other, such that, when a tensile force is applied to the optical fiber, the resultant stress wound not be concentrated at the connection section between the optical plug and the optical fiber, but would be distributed in the holder through the tube, and therefore concentration of stress on the optical fiber can be alleviated. Also, compared to a case where the optical fiber is affixed to an area adjacent to the through hole, the radius of curvature of the optical fiber becomes relatively large, and therefore concentration of stress and strain on the optical fiber can be alleviated. Furthermore, because the tube and the optical fiber are affixed to each other, the assembly work and handling of the module become much easier.

(2) An optical module in accordance with another embodiment of the invention includes: an optical plug that supports one end of an optical fiber; a receptacle unit that has an optical element and optically couples the optical fiber and the optical element; a holder having a through hole for passing the optical fiber and a housing section that contains the optical plug and at least a portion of the receptacle unit; and a sheet having one end connected to the through hole, extending outside the holder in a manner to cover an upper section or a lower section of the optical fiber, and adhered to the optical fiber at the other end thereof on the opposite side of the through hole.

According to the structure described above, even when the optical plug and the holder are contained at positions mutually shifted from each other, the resultant deformation (bent) of the optical fiber becomes gentler, such that concentration of stress and strain can be alleviated. In particular, the permissible range of positional deviations between the optical plug and the holder is improved, compared to a case where the optical fiber is affixed at a position near the through hole. Also, the optical coupling efficiency can be improved. Also, the sheet and the optical fiber are affixed to each other, such that, when a tensile force is applied to the optical fiber, the resultant stress would not be concentrated at the connection section between the optical plug and the optical fiber, but would be distributed in the holder through the sheet, and therefore concentration of stress on the optical fiber can be alleviated. Also, compared to a case where the optical fiber is affixed to an area adjacent to the through hole, the radius of curvature of the optical fiber becomes relatively large corresponding to the length of the sheet, and therefore concentration of stress and strain on the optical fiber can be alleviated. Also, the sheet and the optical fiber are affixed to each other, such that the assembly work and handling of the module become much easier.

(3) An optical module holder in accordance with an embodiment of the invention pertains to a holder that forms an outer circumference of an optical module that optically couples an optical fiber and an optical element, wherein the holder has a through hole for passing the optical fiber, and a tube or a sheet provided at the holder, connected to the through hole and extending outside of the holder.

According to the structure described above, even when the optical plug and the holder are stored at positions mutually shifted from each other, the optical fiber would be guided by the tube or the sheet, such that the resultant deformation (bent) of the optical fiber becomes gentler, and therefore concentration of stress and strain can be alleviated. Also, a reduction in the optical coupling efficiency can be suppressed. Further, because the optical fiber is guided by the tube or the sheet, the optical fiber can be more readily stored in the holder. Also, the tube or the sheet serves as a guide for positioning the optical fiber.

DESCRIPTION OF EXEMPLARY EMBODIMENTS

Preferred embodiments of the invention are described below with reference to the accompanying drawings. It is noted that members having like functions are appended with identical or related reference numerals, and their description shall not be repeated.

Embodiment 1

Figure 1:
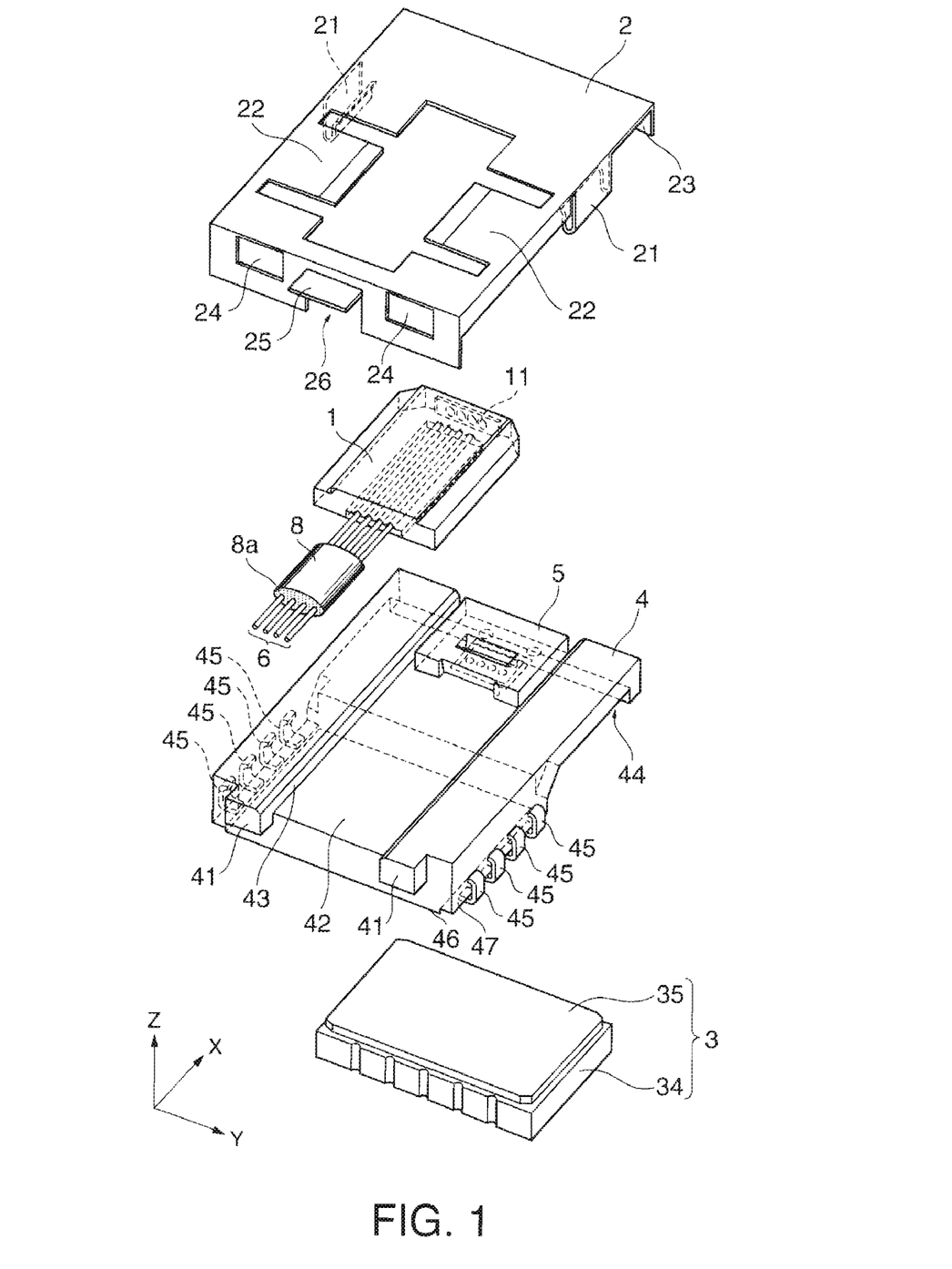
FIG. 1 is an exploded perspective view of the overall structure of an optical module in accordance with Embodiment 1 of the invention.
Figure 2:
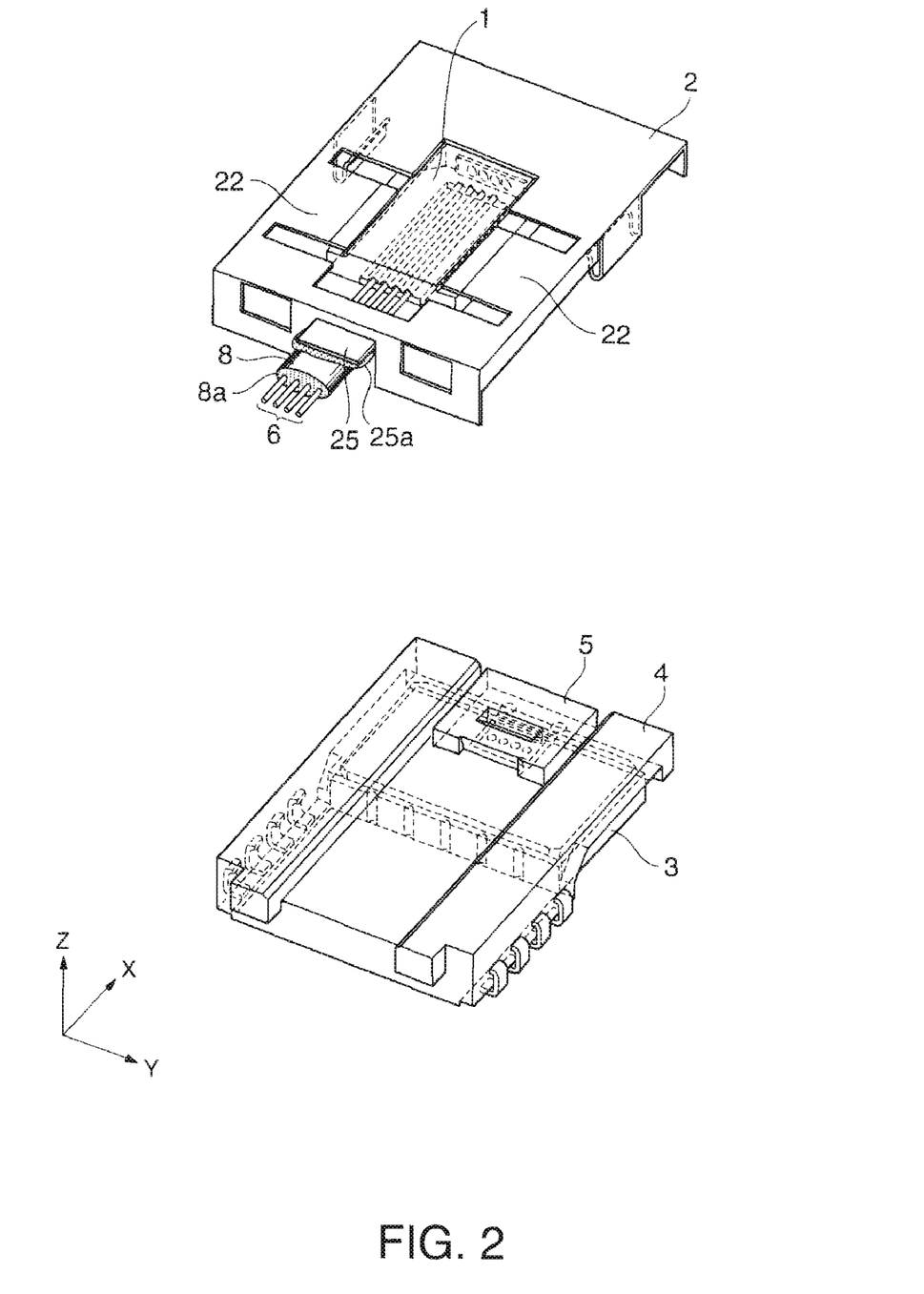
FIG. 2 is an exploded perspective view of the structure of the optical module showing a plug unit and a receptacle unit separated from each other.
Figure 3:
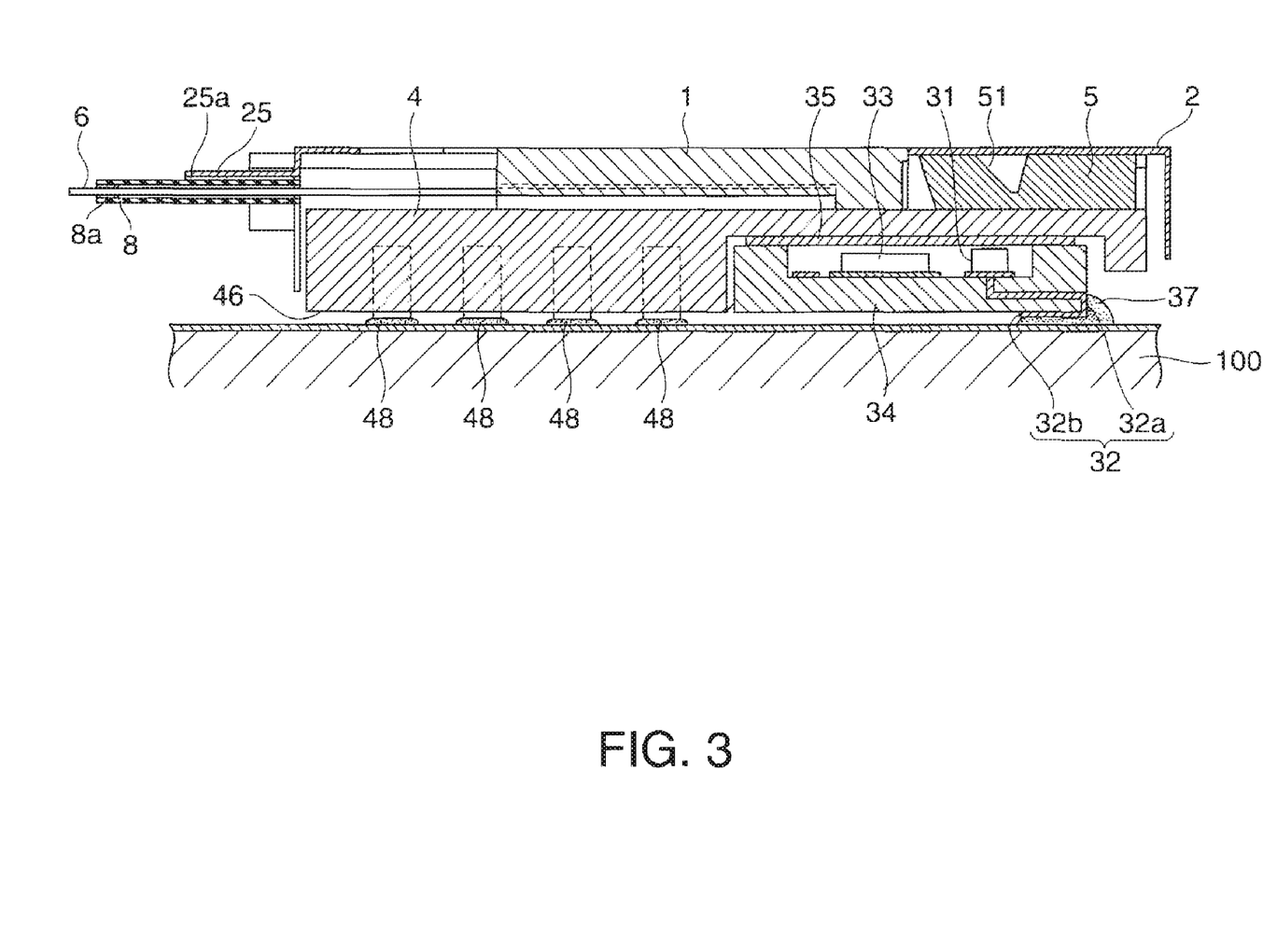
FIG. 3 is a cross-sectional view of the optical module taken along a direction in which the optical fiber extends.
Figure 4:
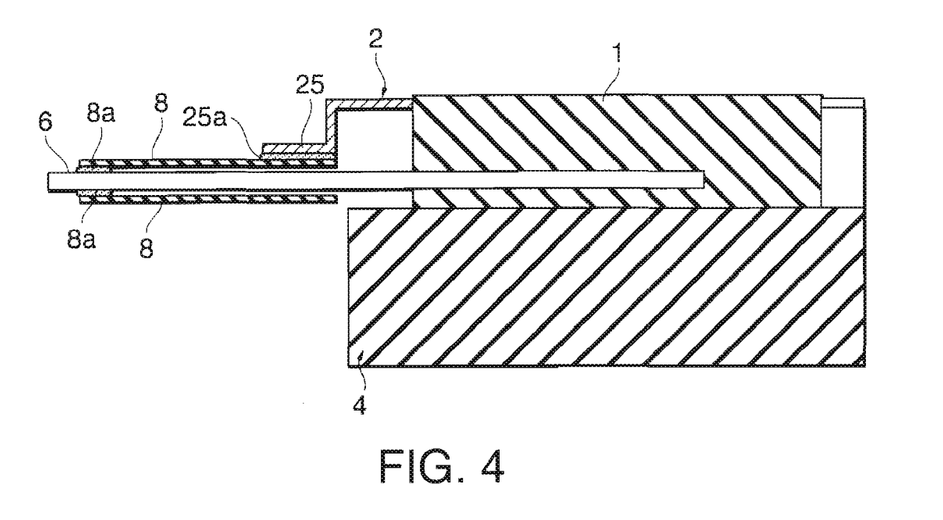
FIG. 4 is a cross-sectional view in part of the optical module in accordance with Embodiment 1.

FIG. 1 is an exploded perspective view of the overall structure of an optical module in accordance with an embodiment of the invention. FIG. 2 is an exploded perspective view of the structure of the optical module showing a plug unit and a receptacle unit separated from each other. FIG. 3 is a cross-sectional view of the optical module taken along a direction in which the optical fiber extends. FIG. 4 is a cross-sectional view in part of the optical module in accordance with Embodiment 1.

The optical module in accordance with the embodiment shown in the figures may be an optical module disposed on, for example, a substrate equipped with an electric circuit (a circuit substrate 100), and includes an optical plug 1, a clamp (holder) 2, a ceramic package 3, a resin package 4, and an optical block 5. The optical plug 1 and the clamp 2 jointly form a plug unit, and the ceramic package 3, the resin package 4 and the optical block 5 jointly form a receptacle unit.

The optical plug 1 supports one ends of optical fibers 6. The optical plug 1 may be formed by, for example, resin injection molding. The optical plug 1 has V-letter shaped grooves and a plate member that covers the grooves. One ends of the optical fibers 6 are disposed in the V-letter shaped grooves, and the ends of the optical fibers are pressed by the plate member, thereby supporting the optical fibers 6. Also, the optical plug 1 may have a focus lens 11 that is disposed on the optical axis of the optical fiber 6. In the example shown in the figure, plural focus lenses 11 are provided at one end of the optical plug 1 in its longitudinal direction.

Also, a tube 8 is mounted on the optical fibers 6 that protrude from the optical plug 1, and the optical fibers 6 and the tube 8 are adhered (bonded, connected) to one another by adhesive 8a at one end of the tube 8 (at an end section thereof on the opposite side of the optical plug 1).

The clamp 2 is disposed in a manner to enclose the entirety of the receptacle unit, thereby joining the optical plug 1 and the receptacle unit in one piece. In other words, the clamp 2 has a housing section for storing the receptacle unit. In this example, the receptacle unit is entirely contained in the clamp 2. However, the receptacle unit can be stored in the clamp 2 in a manner that a portion thereof extends out of the clamp 2. In other words, it is acceptable if at least a portion of the receptacle unit (for example, an optical element 31) is contained by the clamp 2. The clamp 2 may be formed, for example, from a metal plate that is punched out and bent by a punch-press machine. The clamp 2 is equipped with generally J-letter shaped hooks 21 on its side surfaces, leaf springs 22, a light shield section 23, engagement holes 24, an eaves section (a tube bonding section) 25 and a window section (a through hole) 26. The clamp 2 mates with the receptacle unit, thereby joining the receptacle unit and the optical plug 1 together in one piece.

The hooks 21 engage with latch sections 44 of the resin package 4. By this, the receptacle unit and the plug unit are joined together in one piece.

The leaf spring 22 may be formed through cutting an upper portion of the clamp 2 in a generally H-letter shape. The leaf springs 22 hold side sections of a protruded section on the top surface (upper surface) of the optical plug 1 in its longitudinal direction and force the side sections of the protruded section toward a mounting surface 42 of the resin package 4. By this, the optical plug 1 is brought in tight contact with the resin package 4.

The light shield section 23 is disposed at a tip end side of the clamp 2, in a manner to intersect the optical axis of the optical fiber 6. The light shield section 23 is a plate portion formed by bending a portion of the clamp 2 as illustrated. The light shield section 23 prevents laser light emitted from the optical plug 1 from leaking outside when the plug unit is not coupled with the receptacle unit.

The engagement holes 24 are provided in a plate portion that is formed by bending a portion of the clamp 2 at its rear end side. Two engagement holes 24 are provided in the present example. The engagement holes 24 function to retain the receptacle unit and the plug unit in one piece by engaging with engaging pins (protruded sections) 41 provided on the resin package 4, respectively.

The eaves section 25 is formed in a plane by bending a portion of the plate portion of the clamp 2 at its rear end side. The eaves section 25 in the present example is interposed between the two engagement holes 24 generally at the center of the rear end side of the clamp 2. When the optical plug 1 is covered by the clamp 2, the optical fibers 6 are passed through the window section 26 to be placed therein. The eaves section 25 in accordance with the present embodiment is disposed in contact with one side of the window section 26. The eaves section 25 and the tube 8 may be bonded together through adhesive 25a (see FIG. 4).

The window section 26 is formed by cutting a portion of a plate section that is formed by bending a portion of the clamp 2 on its end side. The window section 26 of the present example is interposed between the two engagement holes 24. It is noted that the window section 26 of the present example has one side (at a lower end side) that is open, but this side may be closed. When one side of the window is open, the tube 8 can be more readily disposed in the window section 26, when the optical plug 1 and the clamp 2 are coupled together.

The ceramic package 3 stores the optical element 31 (see FIG. 3), and has electrodes 32 that are electrically connected to the optical element 31. More specifically, the ceramic package 3 in accordance with the present embodiment is formed with ceramic material, and is equipped with a box shaped member 34 having a recessed section for disposing the optical element 31, the circuit chip 33 and the like, and a transparent plate (for example, a glass plate in the present example) 35 disposed on the upper side of the box shaped member 34 in a manner to cover the aforementioned recessed section. The box shaped member 34 and the transparent plate 35 seal up the optical element 31 and the circuit chip 33.

The optical element 31 may be a light emission element (for example, a vertical cavity surface emitting laser (VCSEL)) that outputs optical signals, or a photodetecting element that receives optical signals. The optical element 31 is disposed with its optical axis being generally perpendicular to the transparent plate 35, and emits optical signals through the transparent plate 35 or receives optical signals.

The circuit chip 33 may be a driver that drives the optical element 31, when the optical element 31 is a light emission element; and may be an amplifier that amplifies electrical signals outputted from the optical element 31, when the optical element 31 is a photodetecting element. In the present example as shown in the figure, the optical element 31 and the circuit chip 33 are connected by wire bonding.

The electrodes 32 are formed in a manner that parts thereof are exposed outside the box shaped member 34, and are connected to the optical element 31 and the circuit chip 33 through wirings that pass through the box shaped member 34. The electrodes 32 shall be described in greater detail below.

The resin package 4 functions to support and position the optical plug 1, and is disposed along the optical axis direction of the optical fiber 6, juxtaposed with the ceramic package 3. The resin package 4 is equipped with the engaging pins 41 described above, guide surfaces 42 and 43, a latching section 44, and a plurality of lead electrodes 45. The resin package 4 can be fabricated by, for example, transfer molding with thermosetting type resin such as epoxy resin. When an epoxy resin material mixed with glass fine particles or fibers is used, the dimensional accuracy can be increased, and precise guide surfaces can be formed.

The optical plug 1 is mounted on the guide surface (mounting surface) 42. In the present embodiment, as shown in FIG. 3, the guide surface 42 is formed to be generally in parallel with the surface of the circuit substrate 100, when the optical module is mounted on the circuit substrate 100.

The guide surfaces 43 are formed to be disposed generally orthogonal to the guide surface 42. The guide surfaces 43 are in contact with side surfaces of the optical plug 1. In the present embodiment, the optical plug 1 is positioned by the guide surfaces 43, the guide surface 42, the leaf spring sections 22 and the optical block 5.

The plural lead electrodes 45 are provided in a manner that a part thereof is enclosed by the resin package, and in a manner to protrude toward the lower surface (second surface) that is to be opposed to the circuit substrate 100 of the resin package 4. In the present embodiment, four lead electrodes 45 are provided on each of the sides of the resin package 4 along its longitudinal direction. Also, in accordance with the present embodiment, the lead electrodes 45 are not used for securing electrical connection, but instead used for joining and affixing the resin package 4 onto the circuit substrate 100. It is noted however that the lead electrodes 45 may also be used to secure electrical connection. The lead electrodes 45 are further described below.

The optical block 5 has a light reflection surface 51 that is disposed at an intersection between the optical axis of the optical element 31 and the optical axis of the optical fiber 6. The optical block 5 is disposed on the guide surface 42 of the resin package 4. Also, the optical block 5 is composed of light transmissive resin, and has a sloped surface that is formed by cutting a portion of the resin block, wherein the sloped surface functions as a light reflection surface 51. More concretely, optical signals outputted from the optical element. 31 are focused by the focusing lens formed at the lower surface of the optical block 5 reflected by the light reflection surface 51, and enter one end of the optical fiber 6. Also, optical signals outputted from the optical fiber 6 are reflected by the light reflection surface 51, and focused by the focusing lens described above, and reach the optical element 31.

Next, a mounting state in which the optical module is mounted on the circuit substrate 100 is described in detail.

The electrodes 32 provided at the ceramic package 3 have, as shown in FIG. 3, exposed sections 32a provided on the side surface of the ceramic package 3, and pad sections 32b provided on the lower surface of the ceramic package 3. In the present embodiment, each of the electrodes 32 is provided in a plane orthogonal to an extending direction of the optical fiber 6 to be mounted on the optical module of the ceramic package 3 (i.e., in a plane parallel with the YZ plane). Also, the electrodes 32 are electrically connected and mechanically affixed to connection pads or the like on the circuit substrate 100 through solder 37. More specifically, as shown in FIG. 3, each of the electrodes 32 is bonded to the circuit substrate 100 in a manner that both of the exposed section 32a and the pad section 32b are in contact with the solder 37. It is noted that either the exposed section 32a or the pad section 32b alone may be in contact with the solder.

Each of the lead electrodes 45 on the resin package 4 is formed in a generally L-letter shape as shown in FIG. 1, and provided along a side surface 47 and a lower surface (second surface) 46 of the resin package 4. Also, as shown in FIG. 2 in broken lines, a portion of the lead electrode 45 is contained inside the resin package 4. As shown in FIG. 3, each of the lead electrodes 45 is mechanically affixed to a connection pad or the like on the circuit substrate 100 through solder 48 at a portion of the lead electrode protruding on the lower surface 46 of the resin package 4.

Figure 5:
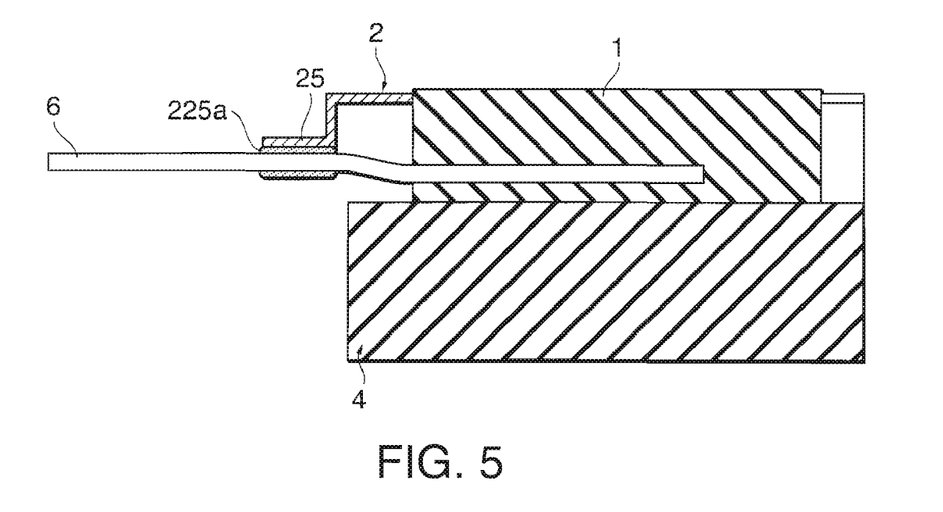
FIG. 5 is a cross-sectional view in part of an optical module that is a comparison example of Embodiment 1.
Figure 6A:
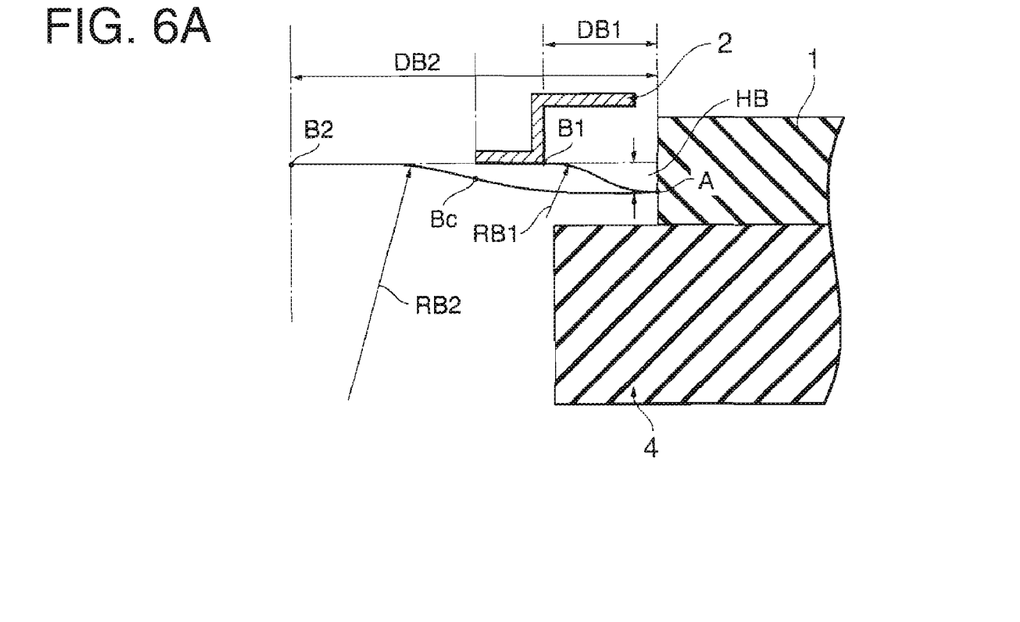
FIGS. 6A-6C are views including a schematic cross-sectional view and formulae for describing stress generated in an optical fiber.
Figure 6B:
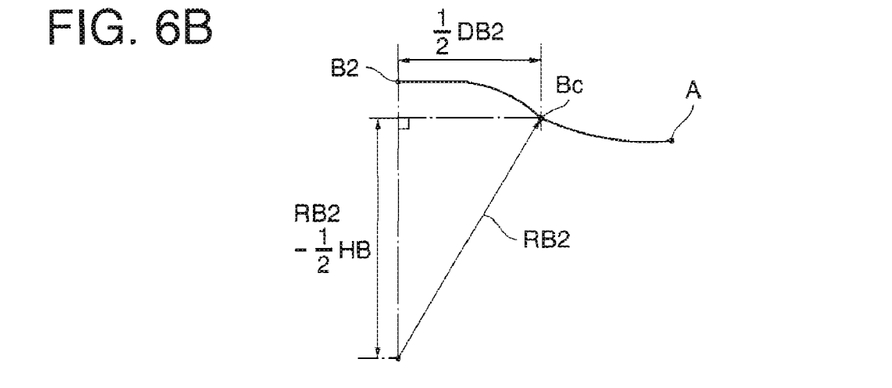
Figure 6C:
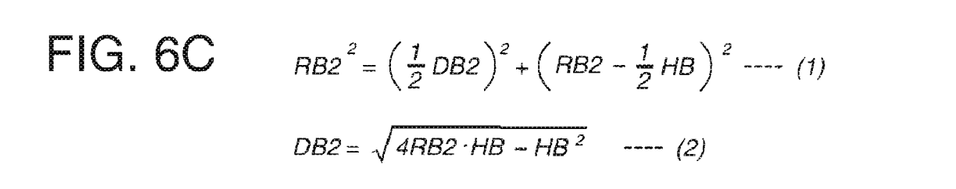

According to the present embodiment, the optical fibers 6 are bundled by the tube 8, and one end of the tube 8 is adhered to the clamp (to the eaves section 25) 2, as shown in FIG. 4, such that the degree of freedom in positioning the optical plug 1 and the clamp 2 can be made greater. The feature is further described with reference to FIG. 5 and FIG. 6. FIG. 5 is a schematic cross-sectional view in part of an optical module in accordance with a comparison example to be compared with the present embodiment. FIG. 6 is a schematic cross-sectional view for describing stress generated in the optical fiber.

The present embodiment improves the permissibility in positional deviation between the optical plug and the clamp, for example, compared to a case shown in FIG. 5 where the optical fiber 6 is directly adhered to the eaves section 25 of the clamp with adhesive 225a.

For example, as shown in FIG. 6A, when a point at which the optical fiber 6 protrudes from the optical plug 1 is a point A, and an end point of the eaves section 25 of the clamp 2 is a point B1, the optical fiber 6 that passes through these points has a greater bent as a deviation between the point A and the point B becomes greater. In this case, when the bend becomes smaller than the permissible radius of curvature (bending radius) of the optical fiber 6, light (signal) cannot be sufficiently transmitted, and therefore the transmission characteristic deteriorates. Further, when the radius of curvature becomes smaller, a large stress is generated in the optical fiber, and its deformation becomes greater, such that the fiber may be damaged, or loads may be applied to its connection point with the optical plug 1 (at the point A) and its connection point with the clamp (at the point B1) such that the durability of the device would be deteriorated even through they are not damaged.

In contrast, in accordance with the present embodiment, a tip section B2 of the tube 8 defines a starting point, such that the radius of curvature RB2 of the optical fiber 6 that passes through the point A and the point B2 is greater than the radius of curvature RB1 of the optical fiber 6 that passes through the point A and the point B1 with the same amount of deviation. Accordingly, the stress generated in the optical fiber 6 can be reduced. Also, the light transmission path can be secured, and therefore the optical coupling efficiency can be improved. In other words, the permissibility in deviations becomes greater, and the yield in manufacturing products is improved. Also, the processing accuracy and assembly accuracy of various parts is eased, such that the throughput of products is improved.

Furthermore, in accordance with the present embodiment, the starting point B2 can be moved up and down because the tube 8 is used. Accordingly, the radius of curvature of the optical fiber that passes through the point A and the point B2 can be made even greater, in other words, the degree of bend of the optical fiber can be made gentler, and therefore the stress can be alleviated and the light coupling efficiency can be improved.

For example, the distance (DB2) between the point A and the point B2 is about 5 mm. In the optical module shown in FIG. 1, for example, the height of the window section for passing the optical fiber 6 (i.e., the distance between the upper side of the window section after assembly and the guide surface 42) is about 0.8-1 mm, and its width is about 1.2-1.5 mm.

Setting of the length of the tube (at the end section of the tube), in other words, setting of the distance DB2 is described. As described above, the radius of curvature of the optical fiber becomes greater as the point B2 is separated even slightly away from the point B1, and the effects described above are attained. However, when the tube 8 is too short, the effects are diminished. On the other hand, when the tube 8 is too long, more problems may be generated.

In this respect, as shown in FIG. 6B, the curvature (the degree of curvature) of the optical fiber 6 is modeled to consider the length of the tube. It is believed that the length of the tube may preferably be set to secure at least DB2 expressed by a formula (2) shown in FIG. 6C.

More concretely, as shown in FIG. 6B, when the optical fiber 6 changes its curve at a point Bc that corresponds to the center of the distance DB2, and its curvature is assumed to be defined by a perfect circle, a formula (1) shown in FIG. 6C is established by Pythagoras' theorem. Accordingly, when the permissible radius of curvature RB2 of the optical fiber, and the distance HB between the end section of the eaves section 25 (the point B1) and the point A are known, DB2 can be obtained by the formula (2). Accordingly, it is believed that the point B2 may preferably be set such that the length of the tube 8 becomes greater than the distance DB2. It is possible to set the point B2 in consideration of details of the characteristics (for example, the curvature and the like) of the optical fiber Furthermore, in accordance with the present embodiment, when a tensile force is applied to the optical fiber 6, the force would be distributed in the clamp 2 through the tube 8, and therefore the stress that may be generated at a connection section (the point A) between the optical plug 1 and the optical fiber 6 can be reduced.

Also, in accordance with the present embodiment, the optical fibers 6 are bundled together by the tube 8, the assembly work for assembling the optical plug and the receptacle unit by the holder in one piece becomes easier. Also, handling of the final products becomes easier. Furthermore, as the optical fibers 6 are affixed to the clamp 2 through the tube 8, the position of the optical plug 1 that supports one end of the optical fibers 6 would not be greatly shifted. Accordingly, a reduction in the optical coupling efficiency due to positional shifts between the optical plug 1 and the receptacle unit would be suppressed.

It is noted that, in accordance with the present embodiment, the tube 8 is adhered to the eaves section 25 at its back surface. However, the tube 8 may also be adhered to the eaves section 25 at its tip section. Further, the tube 8 may be disposed in a manner to cover the eaves section 25, such that the back surface of the tube 8 and the upper surface of the eaves section 25 can be adhered to each other. Also, the eaves section 25 may be formed, for example, in a curved surface that conforms to the curve of the tube 8, instead of a plate shape.

Embodiment 2

Figure 7A:
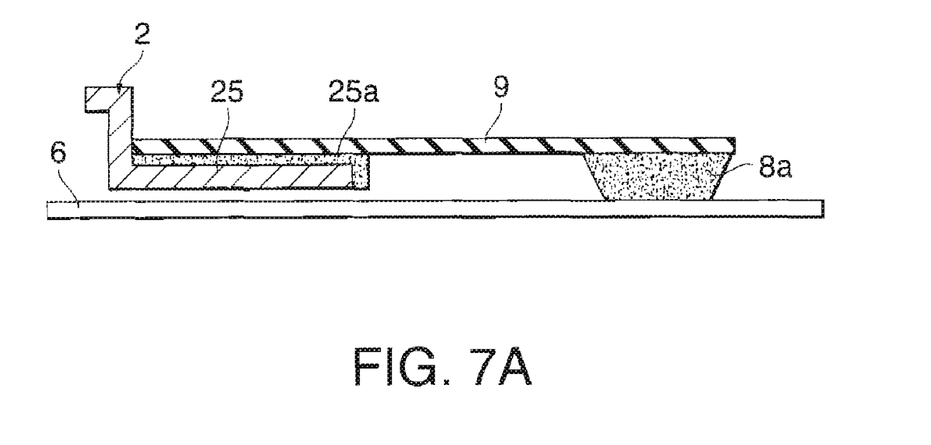
FIGS. 7A and 7B are a cross-sectional view in part and a top plan view in part of an optical module in accordance with Embodiment 2 of the invention.
Figure 7B:
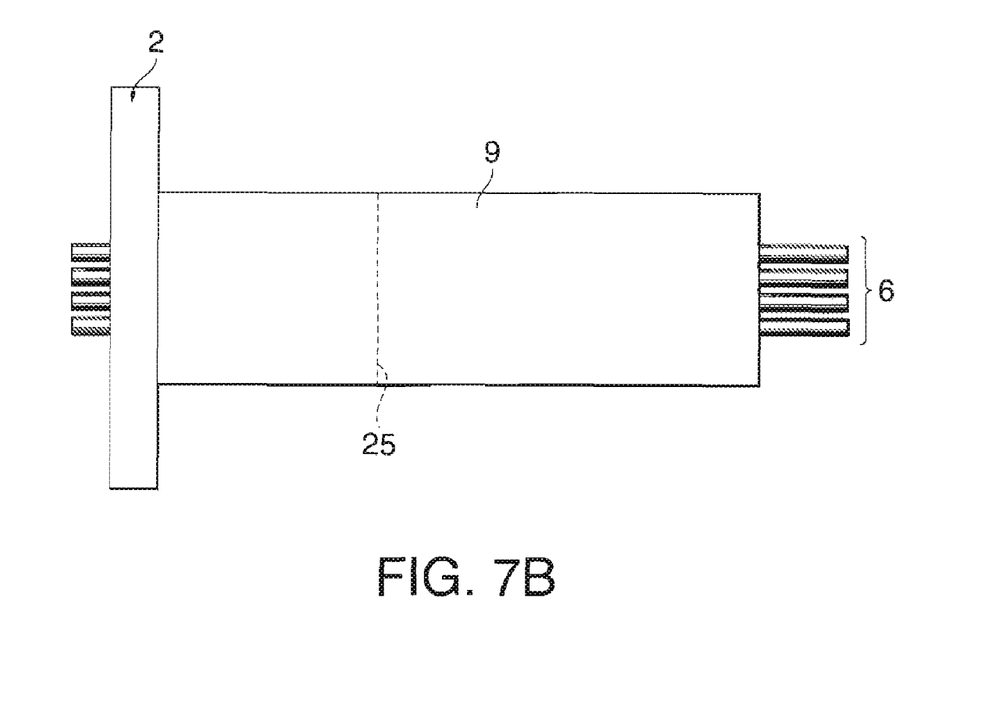

In Embodiment 1, the tube 8 is used. However, the optical fiber 6 and the clamp (the eaves section 25) 2 may be adhered to each other by using a sheet 9. FIGS. 7A and 7B are a cross-sectional view in part and an upper plan view in part of an optical module in accordance with another embodiment of the invention. In these figures, a cross section of an area adjacent to the window section of the optical module in an extension direction of the optical fiber is schematically shown.

As shown in FIG. 7A, the sheet 9 is disposed in a manner to cover the upper surface of the optical fiber 6, and one end of the sheet 9 is adhered to an eaves section 25 of a clamp 2 with adhesive 25a. Also, the sheet 9 is adhered, at its other end, to the optical fibers 6 with adhesive 8a. The sheet 9 is generally in a strip shape (i.e., a generally rectangular shape), as shown in FIG. 7B.

When the sheet 9 is used in this manner, the permissibility in positional deviations between the optical plug and the clamp is improved, like Embodiment 1. Also, the stress that may be generated in the optical fiber 6 can be reduced. Also, the light transmission path can be secured, and therefore the optical coupling efficiency can be improved. Also, the effects described above in Embodiment 1, such as, an increased tolerance of the optical fiber 6 against tensile forces and the like, can be achieved.

In the present embodiment, the sheet 9 is bonded to the upper surface of the eaves section 25, but the sheet can be bonded to the back surface of the eaves section 25. Also, in accordance with the present embodiment, the eaves section 25 is provided at the upper portion of the window section 26. However, the eaves section 25 can be provided at the lower section of the window section 26. In this case, the sheet 9 is located on the lower side of the optical fiber 6, and the top surface of the sheet 9 and the back surface (lower surface) of the optical fiber 6 are bonded to each other. However, the sheet 9 may preferably be positioned on the upper surface of the optical fiber 6. This is because the resin package 4 and the circuit substrate 100 are positioned at the lower side of the optical fiber 6, and therefore a stress in an upward direction would likely be applied to the optical fiber 6.

Embodiment 3

Figure 8A:
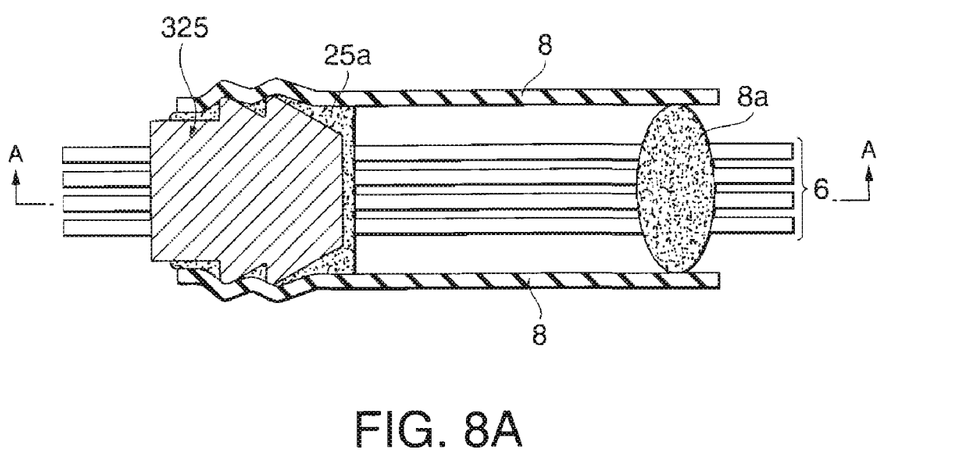
FIG. 8A is a cross-sectional view in part of an optical module in accordance with Embodiment 3 of the invention.
Figure 8B:
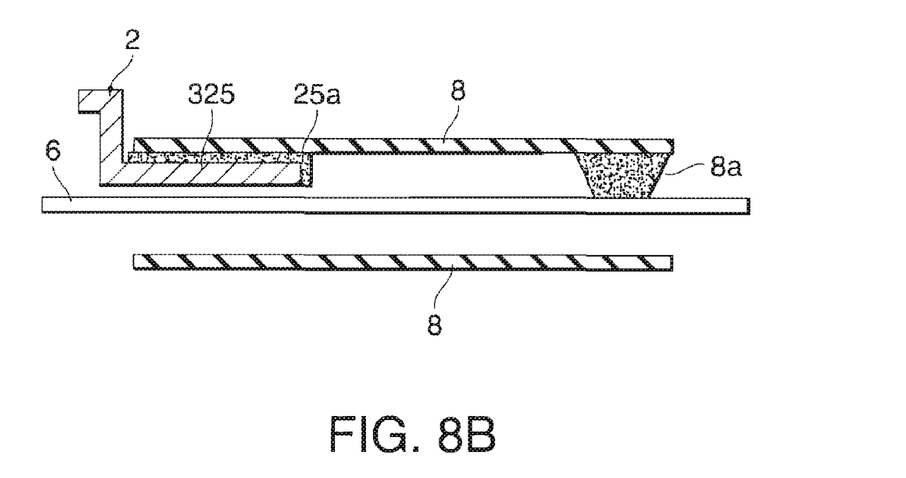
FIG. 8B is a cross-sectional view taken along lines A-A of FIG. 8A.
Figure 9A:
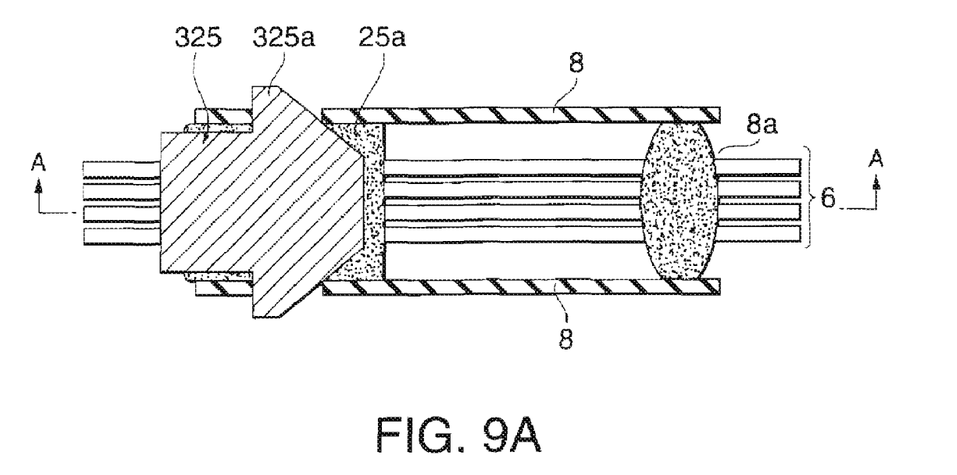
FIG. 9A is a cross-sectional view in part of an optical module in accordance with Embodiment 3 of the invention.
Figure 9B:
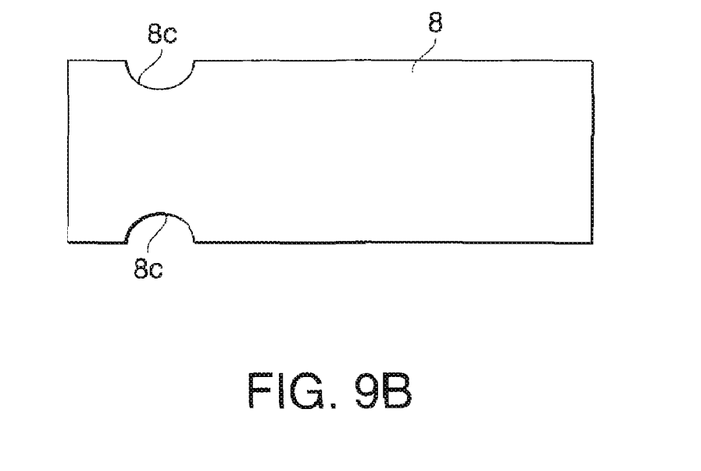
FIG. 9B is a top plan view of a tube.
Figure 10:
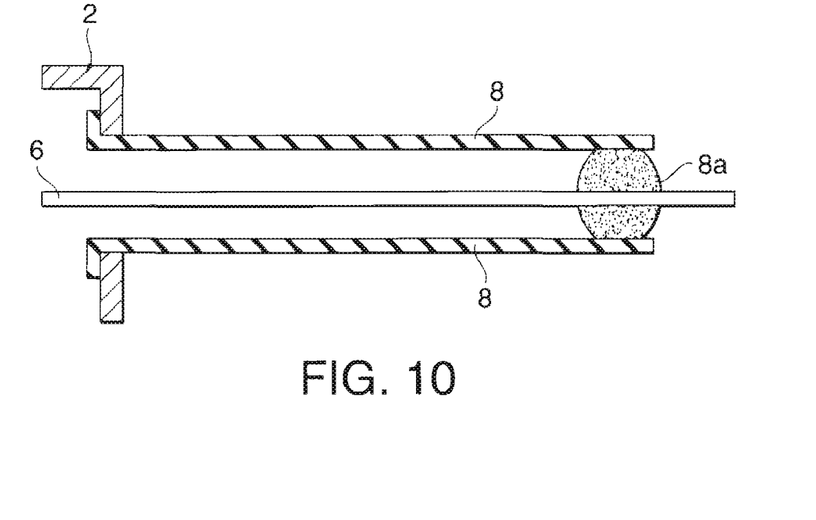
FIG. 10 is a cross-sectional view in part of an optical module having another structure in accordance with Embodiment 3 of the invention.

In Embodiment 1, the tube 8 is bonded to the eaves section 25 of the clamp 2 by using the adhesive 25a. However, in the present embodiment, another connection mode for connecting the tube 8 and the clamp 2 is described. FIGS. 8A and 8B are cross-sectional views in part of an optical module in accordance with the present embodiment Also, FIGS. 9A and 9B are a cross-sectional view in part and an upper plan view in part of an optical module in another composition of the present embodiment, and FIG. 10 is a cross-sectional view in part of an optical module in accordance with still another composition of the present embodiment. In these figures, a cross section of an area adjacent to the window section of the optical module in an extension direction of the optical fiber is schematically shown.

As shown in FIGS. 8A and 8B, in accordance with the present embodiment, an eaves section 325 is formed in a manner to protrude outside of the clamp 2 from an outer periphery of the window section 26. In accordance with the present embodiment, as shown in the figure, irregularities are provided on both sides of the eaves section 325. It is noted that FIG. 8A is a cross-sectional view in a plane parallel with an eaves section of the eaves section 325, and FIG. 8B is a cross-sectional view taken along lines A-A of FIG. 8A.

Accordingly, by inserting a tube 8 over the eaves section 325, the tube 8 and the clamp 2 can be joined together. The tube 8 is inserted over the eaves section 325, in other words, the tube 8 is disposed in a manner to cover (surround) the eaves section 325 thereby joining them together. In this case, the irregularities provided on the both sides of the eaves section 325 would make the tube 8 difficult to be pulled off. Each of the irregularities has a cross-sectional shape that is, for example, a saw-tooth shape. The size and shape of the irregularities can be appropriately modified.

It is noted that the eaves section 325 and the tube 8 may not necessarily be adhered to each other if their bonding strength can be secured. However, by adhering them with the adhesive 25a, the bonding strength may be reinforced. Also, they can be joined together by thermo compression bonding. For example, after the tube 8 is inserted over the eaves section 325, the eaves section 325 may be heated, thereby causing the tube 8 to harden or shrink to reinforce the bonding strength.

As a substitute member for the eaves section 325, a cylindrical member (a cylinder section) having irregularities may be bonded to the outer periphery of the clamp 2. However, the eaves section 325 can be formed at the time when the clamp 2 is formed by press working, and its structure can be made simple.

Further, as shown in FIG. 9A, the eaves section 325 may be provided with a protruded section 325a that protrudes in a direction orthogonal to the extension direction of the tube 8. For example, holes 8c may be provided on both sides of the tube 8 (see FIG. 9B), and the protruded section 325a may be latched onto the holes 8c, whereby the tube 8 and the clamp (the eaves section 325) 2 can be joined together. In other words, the tube 8 is inserted over the eaves section 325, in other words, the tube 8 is disposed in a manner to cover (surround) the eaves section 325, and the protruded section 325a is latched onto the holes 8c, thereby connecting them together. It is noted that FIG. 9A is a cross-sectional view in a plane parallel with an eaves section of the eaves section 325, and FIG. 9B is a top plan view of the tube 8. Also, a cross-sectional view taken along lines A-A in FIG. 9A is the same as that of FIG. 8B. The positions of the protruded section 325a and the holes 8c of the tube 8 may be appropriately modified. Such a structure would make the tube 8 difficult to be pulled off. Further, the tube 8 and the eaves section 325 may be bonded together with adhesive 25a or by thermo compression bonding. In this case, the eaves section 325 may also be formed when the clamp 2 is formed by press working. Also, as a substitute member for the eaves section 325, a cylindrical member having a protruded section 325a may be bonded to the window section 26 of the clamp 2.

Also, as shown in FIG. 10, one end section of the tube 8 may be bonded to the inner side of the window section 26 of the clamp 2. In other words, the end section of the tube 8 may be bonded to the outer circumference section of the window 26 inside the clamp 2. They can be bonded using adhesive, or bonded by thermo compression bonding.

In this manner, by devising the configuration of the connection section between the clamp 2 and the tube 8, their bonding strength can be improved.

Embodiment 4

Figure 11:
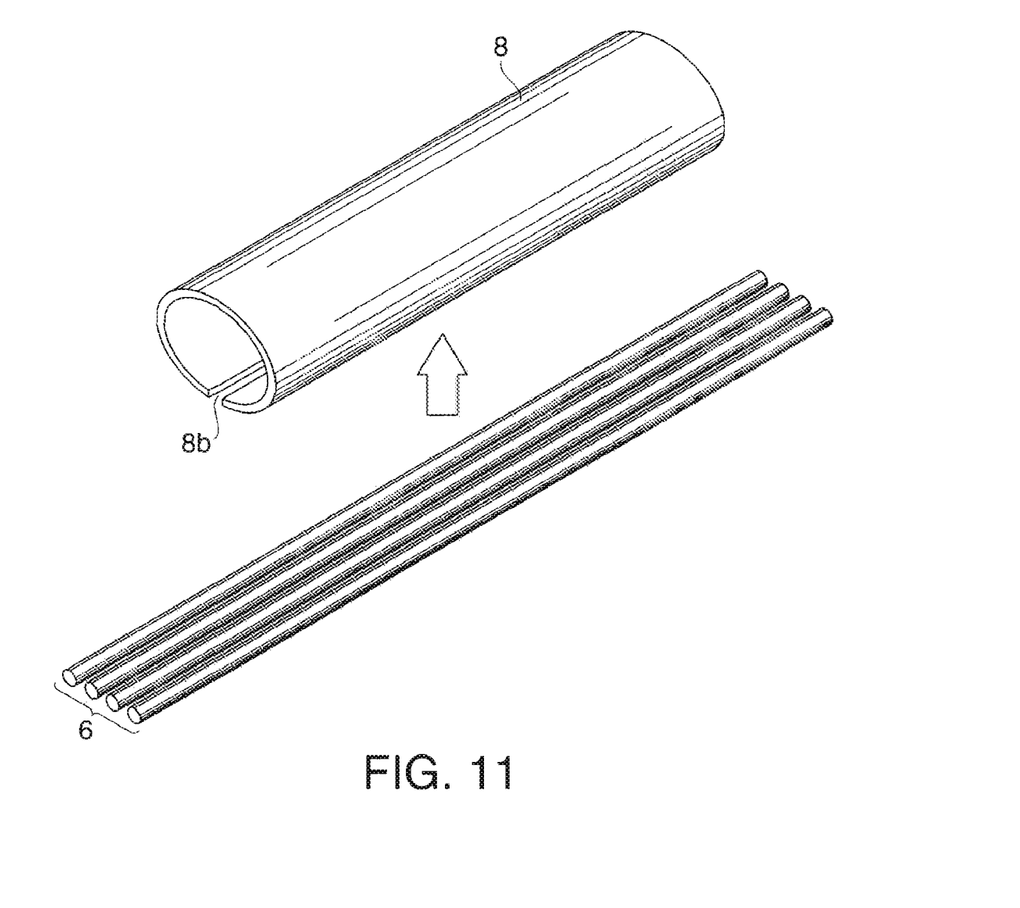
FIG. 11 is a perspective view of a tube used for an optical module in accordance with Embodiment 4 of the invention and optical fibers.

Furthermore, a gap (an opening section) 8b shown in FIG. 11 may be provided in the tube 8 of Embodiment 1. FIG. 11 is a perspective view of the tube and optical fibers using in the optical module of the present embodiment. As shown in the figure, the gap 8b may be provided entirely along the extension direction of the tube 8 at its lower side. In other words, the tube 8 is split in its extension direction. Therefore, the optical fibers can be stored inside the tube 8 through the gap, such that their assembly becomes easier. In particular, this structure is useful when the optical fiber used for the optical module is long, or when a tip of the optical fiber (the end section of the optical fiber on the opposite side of the optical plug 1) is attached to another device.

Other features except the gap 8*b* of the tube are substantially the same as those of Embodiment 1, and therefore description of the other features of the composition is omitted.

It is noted that the various structural features described above in accordance with Embodiments 1 through 4 may be used through appropriately combined, modified or added with improvements according to the intended usages.

Also, in the embodiments described above, their structures are mainly described. However, as for bonding the clamp 2, the tube 8 and the optical fiber 6: (1) the optical fiber 6 and the tube 8 may be bonded (joined), and then the tube 8 may be bonded to the clamp 2: or (2) the tube 8 may be bonded to the clamp 2 in advance, the optical plug 1 may then be fitted in the clamp 2 in a manner that the optical fiber 6 is passed inside the tube 8, and then the tip of the tube 8 and the optical fiber 6 may be bonded together. These methods may be similarly applied when the sheet 9 is used. Then, the receptacle unit is fitted in the clamp 2, whereby assembly of the optical module is completed.

As the material of the tube 8 used in the embodiments described above, a variety of materials can be considered. For example, plastic materials and fibers may be used. Also, as their characteristics, they may preferably have a greater permissible radius of curvature (more difficult to bend) than the optical fiber.

Also, as the adhesive used in the embodiments described above, for example, epoxy or acrylic adhesive may be used.

Also, in the optical modules in the embodiments described above, four optical fibers are illustrated. However, there is no limitation to the number of optical fibers, and a single fiber is also acceptable. Also, an individual tube may be structured to cover each of plural optical fibers.

Also, in the embodiments described above, the optical module having the optical fiber is described as an example. However, the invention can be widely applied to any optical modules having a so-called optical wave guide. For example, the optical wave guide may be composed of quartz glass plastic material (polymers, resin) or a combination of the aforementioned materials. The invention is widely applicable to optical wave guides (optical fibers) that are formed with the aforementioned material.

Also, in Embodiment 1 described above, the tip of the tube 8 is bonded to the optical fiber 6. However, the bonding may be omitted. In this case, the effects described in detail in Embodiment 1 can be obtained, although the tolerance to tensile forces describe above may be lowered.

The entire disclosure of Japanese Patent Application No. 2006-164402, filed Jun. 14, 2006 is expressly incorporated by reference herein.

What is claimed is:

1. An optical module comprising:
   an optical plug that supports one end of an optical fiber;
   a receptacle unit that has an optical element and optically couples the optical fiber and the optical element;
   a holder having a through hole for passing the optical fiber and a housing section that contains the optical plug and at least a portion of the receptacle unit; and
   a tube that is coupled to the through hole and extends outside of the holder.

2. An optical module according to claim 1, the through hole being formed in a side surface of the holder, and the tube being bonded to an eaves section that is formed above the through hole and protrudes outside of the holder.

3. An optical module according to claim 1, the through hole being formed in a side surface of the holder, and the tube covering an eaves section that protrudes outside of the holder from an outer circumference of the through hole and is connected to the eaves section.

4. An optical module according to claim 3, the tube being bonded to the eaves section by thermocompression bonding.

5. An optical module according to claim 4, the eaves section having irregular sections formed on both sides thereof.

6. An optical module according to claim 5, each of the irregular sections having a saw-tooth shaped cross section.

7. An optical module according to claim 1, the tube being adhered to
   an outer circumferential section of the through hole inside the holder.

8. An optical module according to claim 1, the tube being split in a longitudinal direction thereof.

9. An optical module according to claim 1, the optical fiber being adhered to the tube at an end section of the tube on the opposite side of the through hole.

10. An optical module comprising:
    an optical plug that supports one end of an optical fiber;
    a receptacle unit that has an optical element and optically couples the optical fiber and the optical element;
    a holder having a through hole for passing the optical fiber and a housing section that contains the optical plug and at least a portion of the receptacle unit; and
    a sheet that has one end connected to the through hole, extends outside the holder to cover an upper section or a lower section of the optical fiber, and is bonded to the optical fiber at another end thereof on the opposite side of the through hole.

11. An optical module holder comprising:
    a holder composing an outer circumference of an optical module that optically couples an optical fiber and an optical element;
    a through hole section in the holder for passing the optical fiber; and
    a sheet connected to the through hole and extending outside of the holder, the sheet covering at least one of an upper section and a lower section of the optical fiber, and being bounded to another end of the optical fiber on the opposite side of the through hole.

* * * * *